3,053,647
AGGLOMERATION OF IRON ORES
Bernard J. Larpenteur, Cornwall, Pa., assignor to Bethlehem Steel Company, a corporation of Pennsylvania
No Drawing. Filed Apr. 25, 1956, Ser. No. 580,441
3 Claims. (Cl. 75—3)

This invention relates to improvements in ore agglomeration, and particularly to the agglomeration of iron ores into pellet form.

The use of fine iron ores and fine iron concentrate as blast furnace charging material in the form of hardened pellets is increasingly constantly. The proportion of blast furnace ore consumed in this form will continue to grow as recourse is had more and more to such sources of iron as taconite which, prior to beneficiation to increase the relative content of iron oxide, must be ground very fine.

In the preparation of pellets for such use, fine ore or concentrate is mixed with a binder and moisture and this pelletizing mix is fed to a rotating horizontal drum or other suitable balling device, from which the mix is delivered in the form of spherical pellets of relatively low structural strength. The pellets are then subjected to a drying treatment at an elevated temperature in a suitable furnace. The product obtained from the furnace is a hard pellet of sufficient structural strength to withstand handling and shipping, as well as abrasion in the blast furnace, without undue breakage.

The binder now most commonly employed in the preparation of pelletizing mixes for production of iron ore pellets is bentonite, which is a plastic clay having pronounced bloating and adsorbent properties. The bentonite promotes the agglomeration of the ore into compact spheres and greatly increases the so-called dry strength of the spheres upon heating. This dry strength, referred to above, is most important, to avoid reversion of the pellets to the fine state as a result of rough handling.

I have discovered that the strengthening effect of the bentonite is greatly enhanced if a small amount of soda ash is added to the mixture prior to the pelletizing operation. The exact reason for this has not yet been determined, but the result is beyond question.

Soda ash, when added to the pelletizing mix in proper amount, increases both the green or wet strength and the dry strength of the pellets.

I have also discovered that beyond a certain amount, the addition of more soda ash to the pelletizing mix fails to produce any further beneficial effect and may, in fact, if continued further, have an adverse effect.

I have further discovered that the optimum amount of soda ash to be added bears no relation to the amount of bentonite in the mix, but is entirely dependent on the amount of iron concentrate present. Thus, regardless of the amount of bentonite used, the addition of not over two pounds, and preferably only about one pound of soda ash per ton of iron concentrate in the mix, appears in all cases to have the optimum effect.

To illustrate the foregoing, there are given below three tables showing the effect of varying amounts of soda ash per ton of dry iron concentrate when added to mixes containing respectively four, eight and fourteen pounds of bentonite per ton of dry iron concentrate.

TABLE I

*Effect of Soda Ash Additions to Pellets Made With 4 Lbs. of Bentonite Per Ton of Dry Iron Concentrate*

| Soda ash added, Lbs./ton | 18″ Green Drop Test (No. of Drops) | Pellet Strength | | Estimated bonding equivalent in lbs. of bentonite/dry ton of concentrate |
|---|---|---|---|---|
| | | Green Lbs. | Dry Lbs. | |
| 0 | 5.9 | 4.7 | 11.3 | 4 |
| .1 | 6.6 | 4.7 | 11.3 | 4 |
| .3 | 7.8 | 6.9 | 11.6 | 4 |
| .5 | 10.2 | 7.2 | 18.5 | 7 |
| .8 | 11.4 | 7.9 | 23.6 | 10 |
| 1.0 | 11.5 | 8.8 | 28.3 | 12 |
| 2.0 | 9.9 | 7.9 | 25.7 | 11 |
| 4.0 | 8.2 | 6.9 | 18.8 | 7 |

TABLE II

*Effect of Soda Ash Additions to Pellets Made With 8 Lbs. of Bentonite Per Ton of Dry Iron Concentrate*

| Soda ash added, Lbs./ton | 18″ Green Drop Test (No. of Drops) | Pellet Strength | | Estimated bonding equiva lent in lbs. of bentonite/dry ton of concentrate |
|---|---|---|---|---|
| | | Green Lbs. | Dry Lbs. | |
| 0 | 8.9 | 6.0 | 20.1 | 8 |
| .1 | 11.2 | 6.9 | 23.2 | 10 |
| .3 | 13.5 | 7.9 | 26.1 | 11 |
| .5 | 14.3 | 9.4 | 28.6 | 13 |
| .8 | 17.0 | 8.5 | 31.7 | 14 |
| 1.0 | 14.5 | 9.7 | 30.1 | 14 |
| 2.0 | 12.9 | 8.2 | 28.6 | 13 |
| 4.0 | | | | |

TABLE III

*Effect of Soda Ash Additions to Pellets Made With 14 Lbs. of Bentonite Per Ton of Dry Iron Concentrate*

| Soda ash added, Lbs./ton | 18″ Green Drop Test (No. of Drops) | Pellet Strength | | Estimated bonding equivalent in lbs. of bentonite/dry ton of concentrate |
|---|---|---|---|---|
| | | Green Lbs. | Dry Lbs. | |
| 0 | 15.2 | 8.5 | 31.7 | 14 |
| .1 | 18.3 | 8.5 | 35.2 | 15 |
| .3 | 18.1 | 9.4 | 38.0 | 16 |
| .5 | 22.0 | 10.4 | 42.4 | 17 |
| .8 | 17.0 | 9.4 | 46.8 | 18 |
| 1.0 | 16.9 | 8.5 | 51.8 | 20 |
| 2.0 | 20.0 | 9.1 | 52.4 | 21 |
| 4.0 | 18.1 | 9.4 | 45.8 | 18 |

It is apparent from the above tables that while the ultimate strength of the pellets is increased by larger additions of bentonite, for any given amount of bentonite the optimum effect of the soda ash is realized when the soda ash is added in the proportion of one pound to one ton of dry iron concentrate.

While the beneficial effect of the soda ash is obtained regardless of the amount of bentonite used, it appears from the above tables that a greater relative enhancement of the strength of the pellets is realized in mixes in which the amount of bentonite is on the low side. Thus, in Table I where four pounds of bentonite were used, it appears that the addition of one pound of soda ash results in a pellet having a strength equal to one containing twelve pounds of bentonite with no soda ash. In Table III we see that with fourteen pounds of bentonite, the addition of the one pound of soda ash gives a strength equal to that obtained with twenty pounds of bentonite with no soda ash.

My discovery has obvious advantages, the chief one being the definite economy resulting from it, since a pellet of a desired strength may be obtained with the use of much less bentonite than is required when soda ash is not used.

I claim:

1. A pelletizing mix consisting essentially of iron oxide, bentonite, and soda ash, in the following proportions by weight to one ton of iron oxide: bentonite at least four pounds, and soda ash from one-half pound to two pounds.

2. A pelletizing mix consisting essentially of iron oxide, bentonite, and soda ash, in the following proportions by weight to one ton of iron oxide: bentonite at least four pounds, and soda ash about one pound.

3. A hardened pellet produced from a plastic mix consisting essentially of iron oxide, bentonite and soda ash, in the following proportions by weight to one ton of iron oxide: bentonite at least four pounds, and soda ash about one pound.

References Cited in the file of this patent

UNITED STATES PATENTS

| | | |
|---|---|---|
| 2,394,793 | Maier | Feb. 12, 1946 |
| 2,582,386 | Komarek | Jan. 15, 1952 |
| 2,592,421 | Heilman | Apr. 8, 1952 |
| 2,743,172 | De Vaney | Apr. 24, 1956 |
| 2,833,642 | Barker et al. | May 6, 1958 |

OTHER REFERENCES

"Nodulization and Pelletization of Fluorite Flotation Concentrates," U.S. Bureau of Mines, Report of Investigations 4829, December 1951, pp. 10–11.

Bentonite Handbook, Silica Products Co., 700 Baltimore Ave., Kansas City, Mo., 1930, revised 1934, Bulletin No. 107, pp. 6–7.